Figure 1:
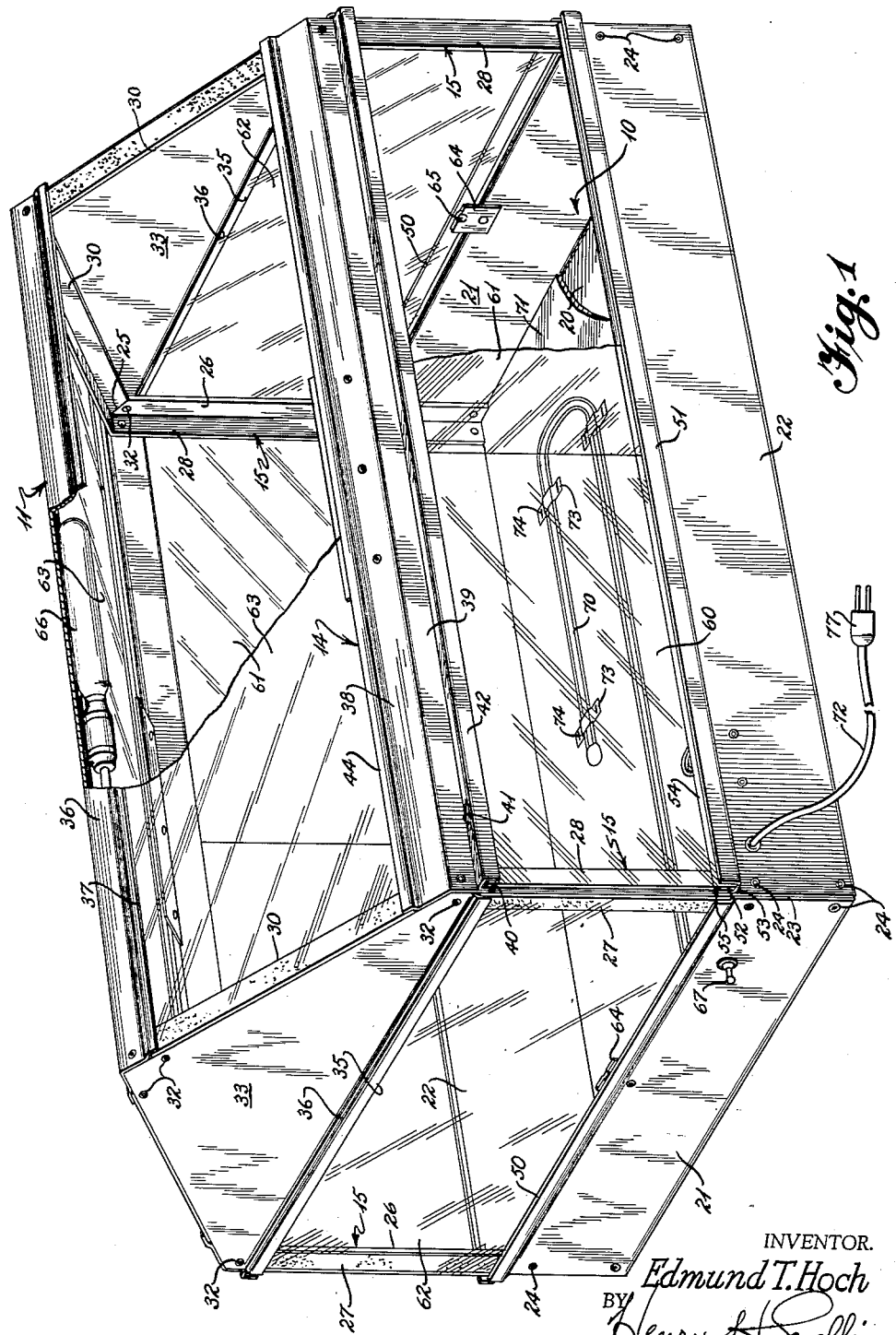

Dec. 13, 1960

E. T. HOCH 2,963,819

PORTABLE GREENHOUSE

Filed Jan. 10, 1958

2 Sheets-Sheet 1

INVENTOR.
Edmund T. Hoch
BY Henry H. Snelling
Attorney

Dec. 13, 1960     E. T. HOCH     2,963,819
PORTABLE GREENHOUSE
Filed Jan. 10, 1958     2 Sheets-Sheet 2
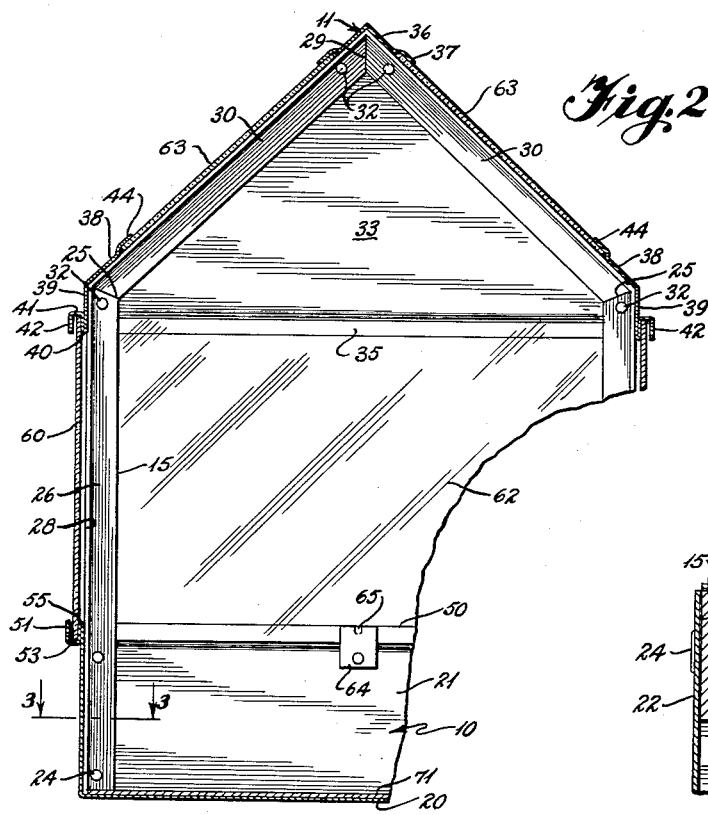
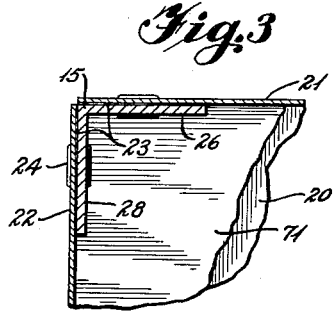
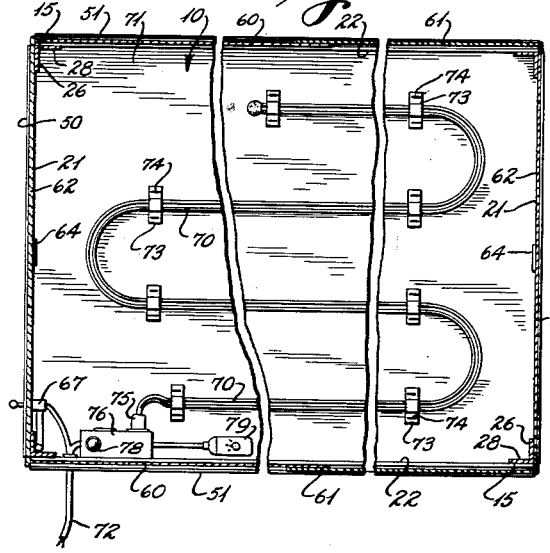
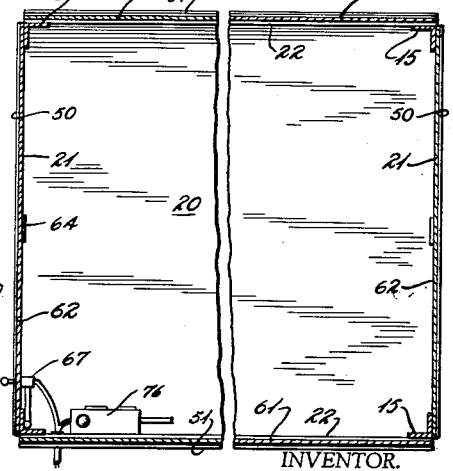
INVENTOR.
Edmund T. Hoch
BY Henry H. Snelling
Attorney

United States Patent Office 2,963,819
Patented Dec. 13, 1960

2,963,819

PORTABLE GREENHOUSE

Edmund T. Hoch, 267 E. Market St., Orangeville, Pa.

Filed Jan. 10, 1958, Ser. No. 708,202

2 Claims. (Cl. 47—17)

This invention relates to portable greenhouses and has for its principal object the provision of a relatively lightweight greenhouse suitable for either indoor or outdoor use and which will have long life.

An important object of the invention is to provide a sturdy all-metal greenhouse framework which will facilitate the growing of plants and flowers not only in homes but in offices, waiting rooms, and similar places.

A further object of the invention is to provide a portable greenhouse which may be used in an ordinary household to save weeks in the early spring by starting seeds or plants earlier than could be done out of doors, whereby on suitable days the greenhouse can be moved outside and the plants can receive direct sunlight, and if desired some of the glass panels can be removed. When so placed outside, if the weather should become much colder, the heating element will permit leaving the greenhouse outside without danger of freezing.

A desirable feature of the present invention is the provision of a portable greenhouse in which orchids and other tropical plants may be grown, as the greenhouse permits the humidity required by orchids, and also provides suitable environment for ample circulation of warm, moist air at all times.

In the drawings:

Fig. 1 is a perspective view of the greenhouse;
Fig. 2 is a partial vertical transverse section;
Fig. 3 is a section on line 3—3 of Fig. 2 on an enlarged scale;
Fig. 4 is a horizontal section; and
Fig. 5 is a similar horizontal section but illustrating the wiring and showing a different arrangement of the glass panes.

The greenhouse framework includes three major portions. a soil-receiving, open-top receptacle 10; a roof assembly including a ridge piece 11, a gable 33 at each end, and parallel cornice beams 14; and as the third portion, upright members 15 forming means for spacing the roof assembly vertically above the receptacle 10. All of these major portions as presently marketed are of aluminum 1/25" in thickness and for greater attractiveness are painted a soft blue-green so that the greenhouse will go with practically any color scheme. While forming no part of the invention it might be noted that such excellent quality aluminum requires a special chemical primer to assure paint adherence. The various portions are secured together by any desired means but preference is given to aluminum expansion rivets of well-known type, the little holes in these rivets adding a bit to the attractiveness of the device.

The receptacle 10 is formed of a bottom 20, end walls 21 and somewhat longer side walls 22, all integral so that the four walls are merely bent upwardly at right angles to the bottom to form the receptacle or container. The corners are sealed as at 23 to prevent loss of moisture from the soil in the bottom of the greenhouse, thus making the receptacle water-tight.

The uprights 15 might be formed of simple straight angle irons each riveted as at 24 to an end wall and a side wall but preferably the uprights at either end are integral, each angle iron being slit as at 25 (Fig. 2) on the flange 26 at the cornice and again at 29 at the top near the ridge pole so that the other flange 28 of the angle iron can be one continuous piece. The central portion 30 of each of the two angle irons is therefore of triangular form, having two parallel legs which are the uprights.

The two sloping portions 30 of the angle irons have secured to them as by the rivets 32 the gables 33, each of these being a flat sheet of metal suitably triangularly shaped and having at its bottom a flange 35 slightly offset as at 36 to provide a guiding and positioning member to receive and hold an end panel 62 of suitable material, preferably glass.

The two main supports formed by the aluminum angle irons 15—30 are held in spaced relation by the ridge piece 11 which is a simple structure consisting of two side portions 36, each having an offset flange or guide 37 quite similar to flange 35 but less deep.

The cornice beam 14 likewise is made of a single strip of metal having a sloping face 38 and a vertical face 39, the strip in this case being reversely bent as at 40 to provide a horizontal flange 41 and a downturned vertical flange 42. The upper face 38 of the strip carries an offset flange 44 which cooperates with the flange 37 in slidingly receiving a translucent or transparent roof panel 63 which may be of glass.

Each of the four walls of the soil-receiving open receptacle has at its top an intergral glass panel holding flange. These flanges are numbered 50 for the end walls 21 and 51 for the longer side walls 22. Flange 50 is similar in size and purpose to the flange 35, cooperating with it to receive slidingly an end glass panel 62 which may be of a length equal to the distance from the outside edges of the uprights 15 but may if desired be of the same length as the overall width of the device in which case the end glass panels would close the end 52 of the panel guide 51 at each side. The guides or flanges 51 are channels similar to the inverted channels formed by the flanges 42, comprising an upwardly extending vertical portion 51, a horizontal bottom portion 53, and an inner side wall 54 which is formed by a 180° bend as at 55. In each of the four side walls the glass panel holding flange, whether simple as at 50 or a full channel as at 51, is integral with the respective side wall.

In the preferred form the longitudinal side glass panels are made of two equal halves 60 and 61 so that either alone may be moved. In this case the end glass panel 62 is the same length as the positioning flanges 35 and 50 so that the panels 60 and 61, which are alined, may both be shifted sideways to facilitate access to the middle of the greenhouse. As the greenhouse framework, in this case, is twice as long as it is wide, the six glass panels are of exactly the same size and therefore interchangeable. When the end glass panels are wider so as to block sliding of the side glass panels, the side glass panels, to be interchangeable, may be longer and slide past each other as in Fig. 5, the channels 52 being wide enough for this purpose. The retainer 64 may have a slight lip as at 65 to resist sliding movement and the flange 26 may carry a felt strip 27 for the same purpose.

The complete greenhouse as sold includes the following items, mentioned here but being elements not claimed. These include an elongated electric bulb 66 controlled by a switch 67, a heater tape 70 stapled to a Masonite board 71 which rests on the bottom of the receptacle 10 and is held in place by a number of short strips 73 stapled as at 74 to the Masonite board. This resistance wire tape 70 is controlled by inserting the plug 75 into the outlet box 76 whenever desired. The outlet box is connected to a suitable outlet as by the plug 77 at the end of extension cord 72. The pilot light 78 glows whenever the plugs 77 and 75 are connected and the heat given to the resistance wire is controlled by a thermostatic control 79 of suitable type, as shown, for example, in Patent Number 2,538,512. The soil, not shown, is piled directly on top of the heater tape 70, with the plug 75 and the thermostat 79 above the top of the soil.

What I claim is:

1. The combination of a greenhouse framework comprising a bottom and four side walls forming together a soil-receiving open receptacle, the four corners of which are sealed to make the receptacle water-tight, two angle iron members each including parallel upright portions each secured to a side wall and an end wall of the receptacle and a pair of integral sloping portions, a sheet metal gable secured to the vertical flanges of the sloping portions of said angle irons, an angular metal beam secured to both angle iron members and extending from the crest of one gable to the other and forming a ridge piece, parallel cornice beams extending from one angle iron to the other and secured thereto at each side, integral guiding flanges at the top and bottom of the cornice beams, the ridge piece and the tops of the sides of the open receptacle cooperating to receive sliding glass panels; with a pair of sloping glass roof panels extending from one angle iron to the other and held by the guides on the ridge piece and the cornice beams, vertical end glass panels slidingly held by the guide flanges on the bottom end walls and the gables, and a pair of sliding glass side panels at each side of the framework between the guides of the cornice beam and the guides on the longitudinal side walls of the receptacle, each of the four side glass panels being movable from contact with the end glass panels for convenient access to any portion of the inside of the greenhouse and means for resisting movement of either of the roof panels or of the end panels, the six vertical glass panels being of the same size and therefore interchangeable.

2. A greenhouse framework comprising a sheet metal bottom and four integral side walls bent upwardly to form a soil receiving open receptacle; a roof assembly including a ridge piece, a sheet metal gable at each end of the ridge piece, and parallel cornice beams extending from one gable to another; a pair of angle irons each bent to form an apex under the ridge piece, a sloping portion lying parallel to the sloping edges of the proximate gable, and four corner uprights spacing the roof assembly vertically above the open receptacle, each of the two angle irons having one flange slit at the ridge and at the cornice, means securing the slit flange of each angle iron to the proximate gable and to the side wall beneath the gable and for rigidly securing the continuous flange to the remaining two side walls, to the ridge piece and to the cornice beams, and means integral with the receptacle and the roof assembly respectively for positioning transparent roof panels and transparent side panels on the framework, said last mentioned means including channels opening upwardly and formed by bending the upper portions of the side walls.

References Cited in the file of this patent

UNITED STATES PATENTS

| 2,798,335 | Downey | July 9, 1957 |

FOREIGN PATENTS

| 538,341 | Great Britain | July 30, 1941 |
| 557,269 | Great Britain | Nov. 12, 1943 |
| 667,383 | Great Britain | Feb. 27, 1952 |